G. REINER.
WHEEL.
APPLICATION FILED OCT. 13, 1919.

1,333,341.

Patented Mar. 9, 1920.
2 SHEETS—SHEET 1.

WITNESSES

INVENTOR
George Reiner.
BY
ATTORNEYS

G. REINER.
WHEEL.
APPLICATION FILED OCT. 13, 1919.
1,333,341.
Patented Mar. 9, 1920.
2 SHEETS—SHEET 2.
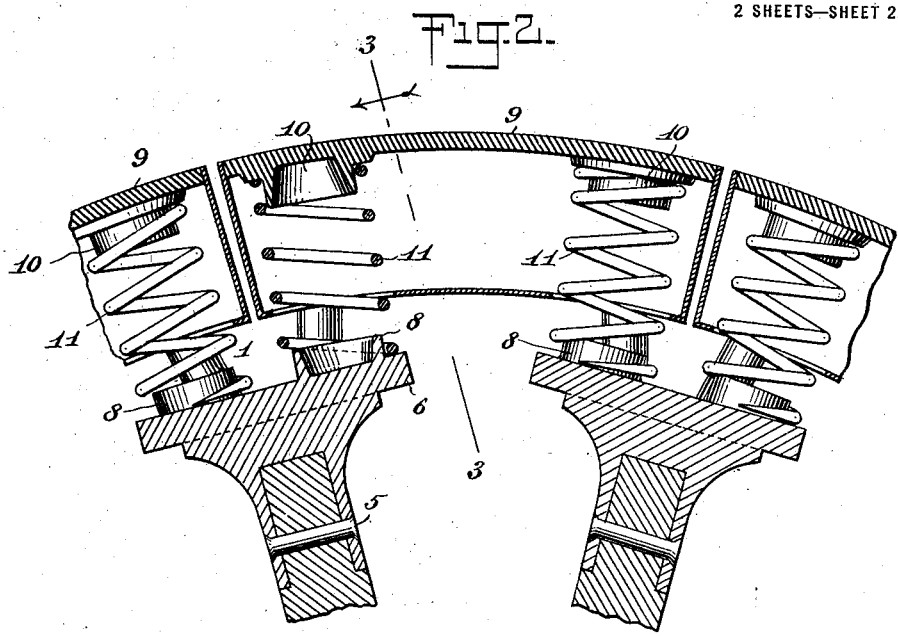
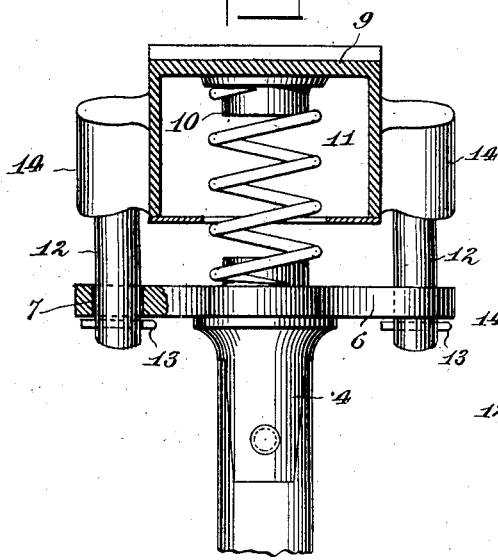
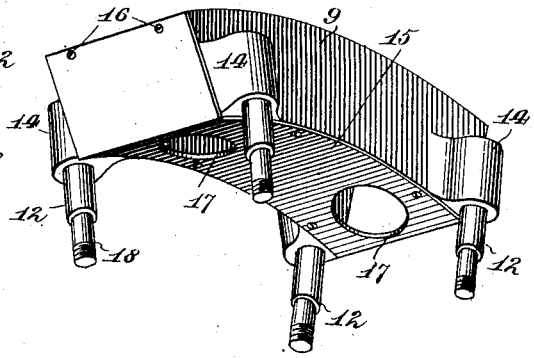
WITNESSES
INVENTOR
George Reiner.
BY
ATTORNEYS

UNITED STATES PATENT OFFICE.

GEORGE REINER, OF NEW YORK, N. Y.

WHEEL.

1,333,341.   Specification of Letters Patent.   Patented Mar. 9, 1920.

Application filed October 13, 1919. Serial No. 330,221.

*To all whom it may concern:*

Be it known that I, GEORGE REINER, a citizen of the United States, and a resident of the city of New York, Elmhurst, borough of Queens, in the county of Queens and State of New York, have invented a new and Improved Wheel, of which the following is a full, clear, and exact description.

This invention relates to improvements in wheels, and more particularly to wheels having elastically supported tire sections which cushion the jars and vibrations and provide an easy running vehicle support.

A further object is to provide a wheel with an improved series of tire segments, each segment capable of independent cushioned movement.

With these and other objects in view the invention consists in certain novel features of construction, and combinations and arrangements of parts, as will be more fully hereinafter described and pointed out in the claims.

In the accompanying drawings—

Fig. 2 is a fragmentary view in section on an enlarged scale;

Fig. 3 is a view in section on the line 3—3 of Fig. 2; and

Fig. 4 is a perspective view of one of the tire segments.

Figure 1:
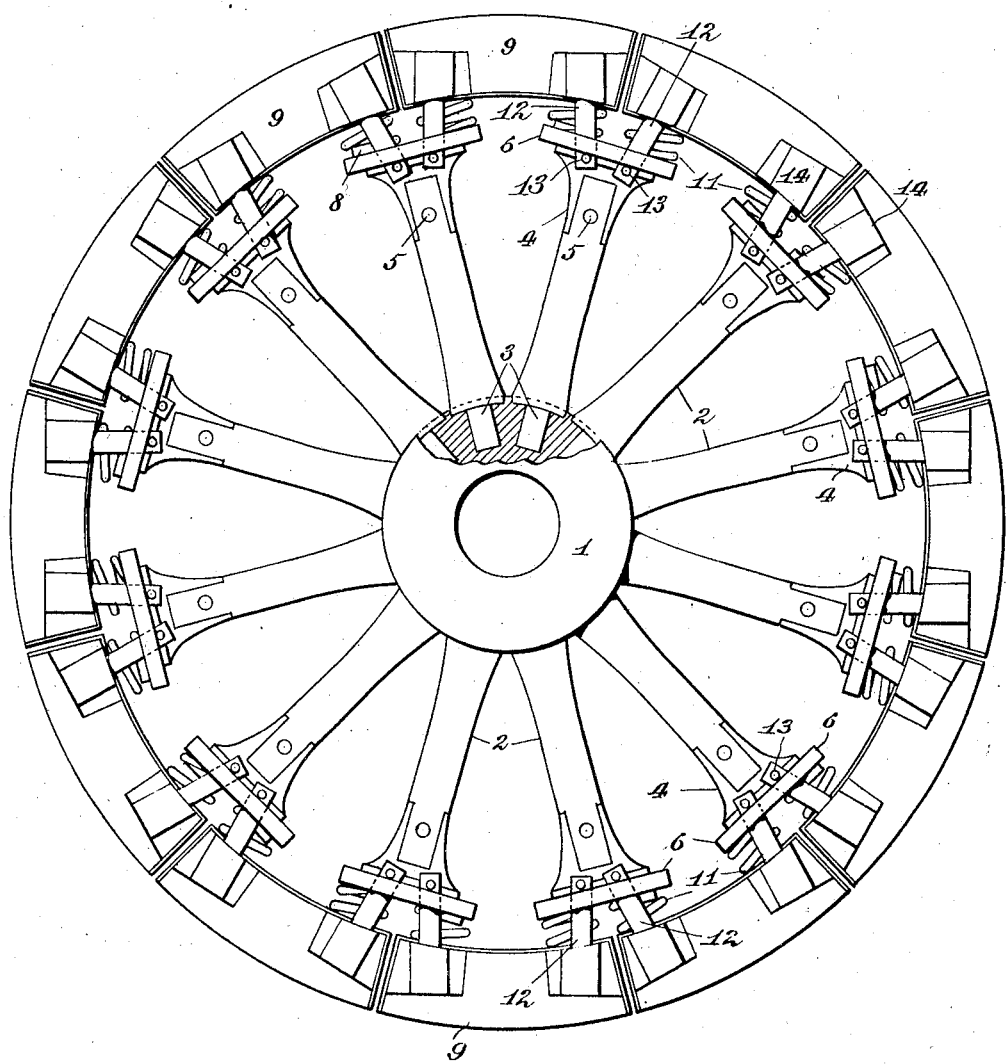
Figure 1 is a view in side elevation partly in section illustrating my improved wheel.

1 represents the hub of my improved wheel to which a circular series of spokes 2 are secured, and I have illustrated as a securing means for the spokes the ordinary mortise and tenon connection 3. Each spoke 2 carries a bracket 4 at its outer end and these brackets 4 are preferably bifurcated at their inner ends and are secured to the spokes by pins 5. The brackets 4 have plates 6 preferably integral therewith and these plates are provided with four openings 7 and with a pair of cylindrical lugs 8.

The tire of my improved wheel comprises a circular series of segments 9, these segments being preferably hollow and having integral lugs 10 which are positioned in alinement with the lugs 8, and coiled springs 11 bear against the plates 6 and segments 9 and are seated at their ends around the lugs 8 and 10 respectively.

Each segment 9 is provided with four inwardly projecting pins 12 which are positioned and movable in the openings 7 of the plates 6 and cross pins or other suitable securing devices 13 are positioned through the inner ends of the pins to limit the outward movement of the pins and the segments 9 to which they are connected. The pins 12 are carried by integral brackets 14 at the sides of the segments and are integral with the brackets or rigidly fixed thereto in any approved manner.

As above stated, the segments 9 are hollow and in order to exclude dirt and foreign matter therefrom covering plates 15 are secured to the bottom faces of the segments and the ends of said plates are bent outwardly and secured to the ends of the segments. These plates are preferably removably secured to the segments by screws 16 so that they can be conveniently detached as occasion may require and holes 17 are provided in the plates 15 to accommodate the springs 11.

Instead of employing pins 13 to limit the outward movement of the segments 9, the inwardly projecting pins 12 may be screw threaded, as shown at 18 in Fig. 4, for the reception of nuts.

The operation is as follows: The weight on the wheel, when the latter is on the ground, causes the segments bearing on the ground to move upwardly and inwardly toward the hub compressing the springs 11, thus cushioning the wheel and each successive segment coming in contact with the ground brings its pair of springs under compression so that the wheel is always cushioned and vibrations and jars are consumed.

A wheel of this type will take the place of the ordinary pneumatic tire wheel and will, of course, be puncture proof and will be strong and durable to perform the functions intended without the constant expense of renewing and repairing tires.

It will be noted that I provide each spoke with a separate plate and dispense altogether with the ordinary continuous rim so that mud and dirt, which accumulate against the inner faces of the tire segments, can be forced out between the spokes and plates and not form a continuous cake to interfere with the movement of the segments.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A wheel, comprising a hub, spokes projecting from the hub, a separate plate on each spoke having openings therein, segments, pins on the segments projecting through the openings in the plates, and springs interposed between the segments and the plates.

2. A wheel, comprising a hub, spokes projecting from the hub, a separate plate secured on each spoke and having openings therein, segments, pins carried by the segments and movable in said openings, securing devices at the inner ends of the pins limiting the outward movement of the segments, and springs interposed between the segments and the plates.

3. A wheel, having a circular series of independent plates thereon, tire segments, pins on the tire segments movable through the plates, said tire segments being hollow, removable plates secured to the inner faces of the segments and having openings therein, and springs interposed between the segments and the plates and projecting through said openings.

4. A wheel, comprising a circular series of perforated plates, tire segments, pins on the segments movable through the perforated plates, said segments having open inner faces and open ends, removable plates covering the inner faces and ends of the segments, and having openings therein, and springs projecting through said openings and bearing against the segments and the plates respectively.

5. A wheel, comprising a hub, spokes projecting from the hub, bifurcated brackets secured on the ends of the spokes, plates on the brackets having openings therein, segments, pins on the segments movable in the openings in the plates, means limiting the outward movement of the pins, and springs interposed between the segments and the plates.

GEORGE REINER.